United States Patent
Moghaddam

(10) Patent No.: US 7,324,688 B2
(45) Date of Patent: Jan. 29, 2008

(54) FACE RELIGHTING FOR NORMALIZATION OF DIRECTIONAL LIGHTING

(75) Inventor: Baback Moghaddam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 531 days.

(21) Appl. No.: 11/057,828

(22) Filed: Feb. 14, 2005

(65) Prior Publication Data

US 2006/0182367 A1    Aug. 17, 2006

(51) Int. Cl.
  *G06K 9/00*    (2006.01)
  *G06K 9/36*    (2006.01)
(52) U.S. Cl. ............ 382/154; 382/100; 382/285; 382/118
(58) Field of Classification Search ........... 382/276, 382/118, 154, 203, 125, 190, 224, 108, 115, 382/100, 285
  See application file for complete search history.

(56) References Cited

U.S. PATENT DOCUMENTS

| 2004/0076313 | A1* | 4/2004 | Bronstein et al. | 382/118 |
| 2006/0227137 | A1* | 10/2006 | Weyrich et al. | 345/426 |
| 2006/0251298 | A1* | 11/2006 | Bronstein et al. | 382/118 |
| 2006/0280342 | A1* | 12/2006 | Lee et al. | 382/118 |
| 2007/0049832 | A1* | 3/2007 | Edgar et al. | 600/476 |
| 2007/0214406 | A1* | 9/2007 | Rhoads et al. | 715/501.1 |

OTHER PUBLICATIONS

R. Basri and D. Jacobs. Lambertian reflectance and linear subspace. In Int'l Conf. on Computer Vision, vol. 2, pp. 383-390, 2001.

P. Belhumeur and D. Kriegman. What is the set of images of an object under all possible lighting conditions. In Int'l J. Computer Vision, vol. 28, pp. 245-260, 1998.

H. Chen, P. Belhumeur, and D. Jacobs. In search of illumination invariants. In Proc. IEEE Conf. on Computer Vision & Pattern Recognition, pp. 1-8, 2000.

A. Georghiades, D. Kriegman, and P. Belhumeur. From few to many: Generative models for recognition under variable pose and illumination. IEEE Trans. on Pattern Analysis and Machine Intelligence, 40:643-660, 2001.

(Continued)

*Primary Examiner*—Matthew C. Bella
*Assistant Examiner*—Wes Tucker
(74) *Attorney, Agent, or Firm*—Dirk Brinkman; Clifton D. Mueller; Gene V. VinoUur

(57) ABSTRACT

A method determines a direction of a principal light source in an image. An input image I is acquired of an object illuminated by a principal light source from an unknown direction. The input image includes an array of pixels, and each pixel has an intensity I(x, y). An intensity vector $\vec{I}$ is constructed from the intensities of the input image. An albedo map ρ is defined for the object. An albedo vector $\vec{\rho}$ is constructed from the albedo map. A shape matrix N is generated for the object. The albedo vector $\vec{\rho}$ is multiplied by the shape matrix N to obtain a shape-albedo matrix A. Then, a direction s* to the principal light source is estimated from the intensity vector $\vec{I}$, the albedo vector $\vec{\rho}$ and the shape-albedo matrix A according to an optimization $$s^* = \arg\min_s \|\vec{I} - \vec{\rho} - As\|.$$

18 Claims, 3 Drawing Sheets

OTHER PUBLICATIONS

M. J. Jones and P. Viola. Fast multi-view face detection. In Proc. IEEE Conf. on Computer Vision & Pattern Recognition, 2003.

K. C. Lee, J. Ho, and D. Kriegman. Nine points of light: Acquiring subspace for face recognition under variable lighting. In Proc. IEEE Conf. on Computer Vision & Pattern Recognition, pp. 519-526, 2001.

K. Nishino and S. K. Nayar. Eyes for relighting. In Proceedings of SIGGRAPH, 2004.

J. Phillips, H. Moon, S. Rizvi, and P. Rauss. The FERET evaluation methodology for face-recognition algorithms. IEEE Trans. on Pattern Analysis and Machine Intelligence, 22 (10) :1090-1104, 2000.

R. Ramamoorthi. Analytic PCA construction for theoretical analysis of lighting variability in images of a lambertian object. IEEE Trans. on Pattern Analysis and Machine Intelligence, Oct. 24, 2002.

R. Rammamoorti and P. Hanrahan. A signal processing framework for inverse rendering. In Proceedings of SIGGRAPH, 2001.

H. Rowley and T. Kanade. Neural network-based face detection. IEEE Trans. on Pattern Analysis and Machine Intelligence, 20(1) :23-38, 1998.

A. Shashua and T. Riklin-Raviv. The quotient image: Class-based rerendering and recognition with varying illuminations. IEEE Trans. on Pattern Analysis and Machine Intelligence, 23(2) :129-139, 2001.

Z. Wen, Z. Liu, and T. S. Huang. Face relighting with radiance environment maps. In Proc. IEEE Conf. on Computer Vision & Pattern Recognition, 2003.

W. Y. Zhao and R. Chellappa. Symmetric shape-from-shading using self-ratio image. Int'l J. Computer Vision, 45 (1) :55-75, 2001.

* cited by examiner

FACE RELIGHTING FOR NORMALIZATION OF DIRECTIONAL LIGHTING

FIELD OF THE INVENTION

The invention relates generally to image processing, and more particularly to photometrically normalizing images of objects.

BACKGROUND OF THE INVENTION

In many computer vision systems, and specifically in face identification systems, it is very difficult to design systems that are invariant to arbitrary lighting. Indeed, large independent U.S. government tests have concluded that the identification of faces in images acquired with arbitrary lighting fail to achieve the success rate of faces in images acquired with controlled lighting, see Phillips, "Face Recognition Vendor Test (FRVT) 2002 report," Technical report, National Institute of Standards and Technology, March 2003, and Phillips et al., "The FERET evaluation methodology for face-recognition algorithms," IEEE Trans. on Pattern Analysis and Machine Intelligence, 22(10), pp. 1090-1104, 2000.

The present invention provides a solution for the difficult but routine problem of facial identification as applied to access control and surveillance applications.

In such applications, an image is acquired of a face of a possibly unknown individual in an arbitrary scene under arbitrary illumination. A camera at a fixed pose, e.g., frontal, acquires the image. The camera is uncalibrated and has unknown intrinsic parameters. The image can obtained from a video, archival photography, web imagery, family photo albums, identification photograph, and the like.

Without any 3D measurement of the individual or the scene, the problem is to match the face in the single image to images of known individuals stored in a database. The stored images were acquired under fixed lighting, e.g., diffuse or frontal.

To solve this problem, all images need to be normalized geometrically and photometrically to provide a single fixed illumination template suitable for robust pattern matching and illumination invariant face identification. Naturally, the canonical choice of illumination would include non-directional or diffuse, or at least frontal, lighting that maximizes visibility of all key facial features.

Because the focus is on illumination-invariance, it is assumed that the geometric normalization is performed in a preprocessing step. The preprocessing can include detecting the location of the face in the image, detecting facial features, such as the eyes, rigid transforms, i.e., scale, rotation and translation, to align the detected features. It is also assumed that some simple photometric normalization may have already taken place, e.g., a non-spatial global transform, which is only a function of intensity, e.g., gain, contrast, and brightness.

Much of the prior art on modeling lighting has focused on finding a compact low-dimensional subspace to model all lighting variations. Under theoretical Lambertian assumption, the image set of an object under all possible lighting conditions forms a polyhedral 'illumination cone' in the image space, Belhumeur et al., "What is the set of images of an object under all possible lighting conditions," Int'l J. Computer Vision, volume 28, pp. 245-260, 1998.

Subsequent work that applies the above theory to face recognition is described by Basri et al., "Lambertian reflectance and linear subspaces," Int'l Conf. on Computer Vision, volume 2, pages 383-390, 2001. Basri et al. represent lighting using a spherical harmonic basis wherein the low dimensional linear subspace is shown to be effective for face recognition.

One method analytically determines the low dimensional subspace with spherical harmonics, Ramamoorthi, "Analytic PCA construction for theoretical analysis of lighting variability in images of a Lambertian object," IEEE Trans. on Pattern Analysis and Machine Intelligence, 24, Oct. 2002. Another method arranges lighting to best generate equivalent basis images for recognition, Lee et al., "Nine points of light: Acquiring subspaces for face recognition under variable lighting," Proc. IEEE Conf. on Computer Vision & Pattern Recognition, pages 519-526, 2001.

A complementary approach is to generate a lighting invariant 'signature' image. Although that technique cannot deal with large illumination changes, it does have the advantage that only one image per object is required in the database.

Other prior art normalization techniques generate invariant templates by using histogram equalization or linear ramp subtraction, Rowley et al., "Neural network-based face detection," IEEE Trans. on Pattern Analysis and Machine Intelligence, 20(1), pp. 23-38, 1998.

It is known that the image gradient is illumination-insensitive and can be used in a probabilistic framework to determine the likelihood that two images were acquired from the same object, Chen et al., "In search of illumination invariants," Proc. IEEE Conf. on Computer Vision & Pattern Recognition, pages 1-8, 2000.

The near symmetry of faces can be used to determine an illumination invariant prototype image for an individual without recovering albedos, Zhao et al., "Symmetric shape-from-shading using self-ratio image," Int'l J. Computer Vision, 45(1), pp., 55-75, 2001.

Another method assumes that different faces have a common shape but different texture and determines an albedo ratio as an illumination-invariant signature, Shashua et al., "The quotient image: Class-based rerendering and recognition with varying illuminations" IEEE Trans. on Pattern Analysis and Machine Intelligence, 23(2), pp. 129-139, 2001.

Object relighting methods have also been described for computer graphic applications. One application uses corneal imaging for embedding realistic virtual objects, e.g., faces, into a scene, resulting in synthetic faces that are properly 'relit' in accordance with estimated environmental lighting, Nishino et al., "Eyes for relighting," Proceedings of SIG-GRAPH, 2004.

Another method uses a radiance environment map, Wen et al., "Face relighting with radiance environment maps," Proc. IEEE Conf. on Computer Vision & Pattern Recognition, 2003. That method renders relatively high quality faces using the spherical harmonics, Rammamoorthi et al., "A signal processing framework for inverse rendering," Proceedings of SIGGRAPH, 2001.

However, for face identification there is no need for high-quality rendering or photorealism. In fact, most known 2D face identification systems operate at low to moderate resolutions, e.g., ~100 pixels across the face.

SUMMARY OF THE INVENTION

The invention provides a method for estimating directional lighting in uncalibrated images of objects, e.g., faces. This inverse problem is solved using constrained least-squares and class-specific priors on shape and reflectance.

For simplicity, the principal directional illuminant is modeled as a combination of Lambertian and ambient components. By using a 'generic' 3D shape for the object and an average 2D albedo, the method can efficiently estimate, in real-time, the incident directional lighting with high accuracy, with or without shadows.

The estimate of the directional lighting is used in a forward rendering step to "relight" arbitrarily lit input images of objects to a canonical diffuse form as needed for illumination-invariant object identification.

DETAILED DESCRIPTION OF THE PREFERRED EMBODIMENT

Lighting Estimation

Figure 1:
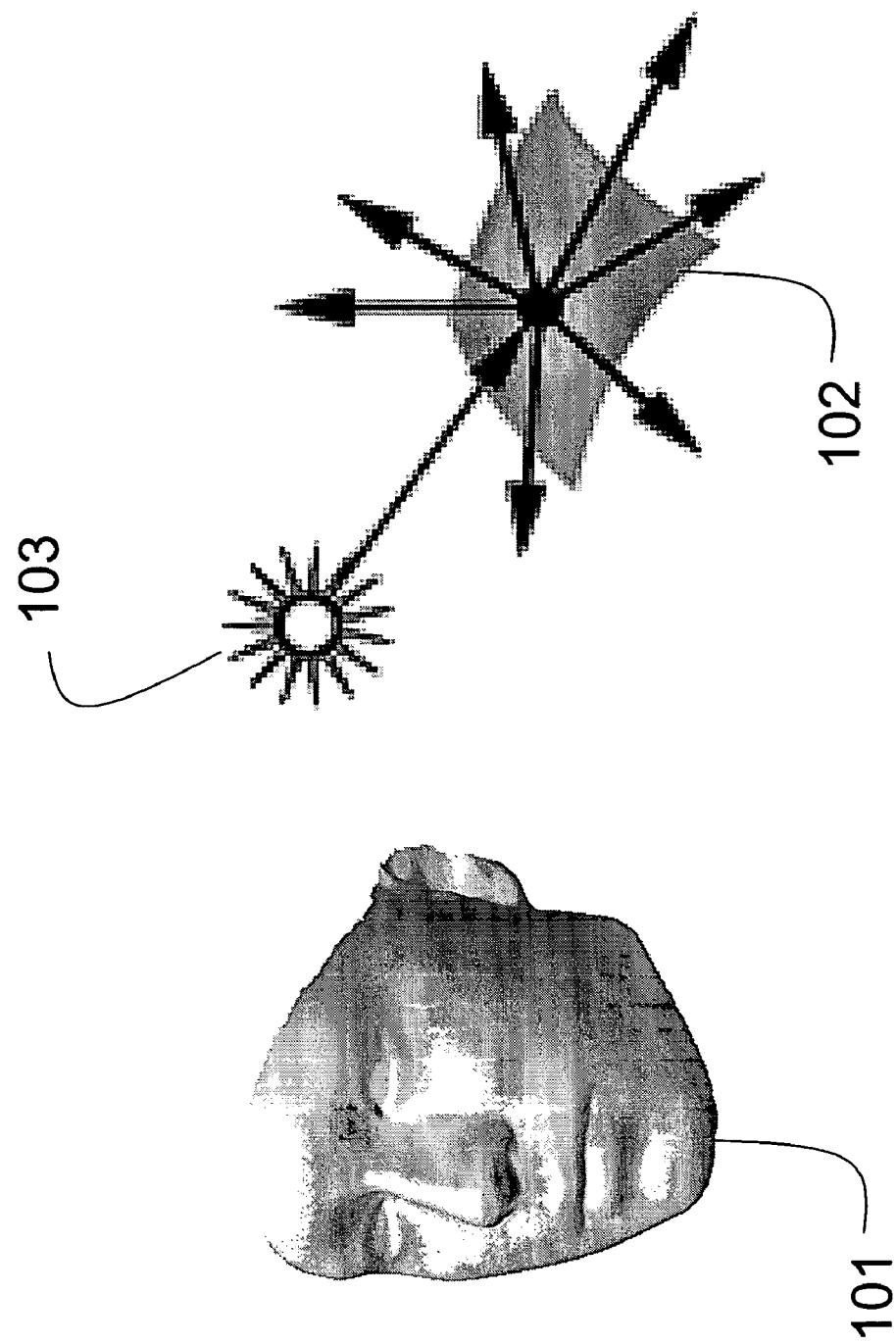
FIG. 1 is a diagram of a shape model and an illumination model according to the invention.

As shown in FIG. 1, my invention uses a generic 3D shape model 101 and a Lambertian or diffuse reflectance illumination model 102 for photometrically normalizing images of objects, e.g., faces. In the illumination model 102 diffuse reflectance has a constant bi-directional reflectance distribution function (BRDF). These models are used for object identification. The example application used to describe my invention is face identification and/or verification. There, the problem is to match an unknown face image to images in a database of known face images.

A face can have some specular reflection, due to secretion of sebum oil by sebaceous glands in the skin. However, the specular reflection is not always consistent. Therefore, the specular reflection is of little use in face identification. Hence, my illumination model 102 includes only Lambertian and ambient components.

Figure 2:
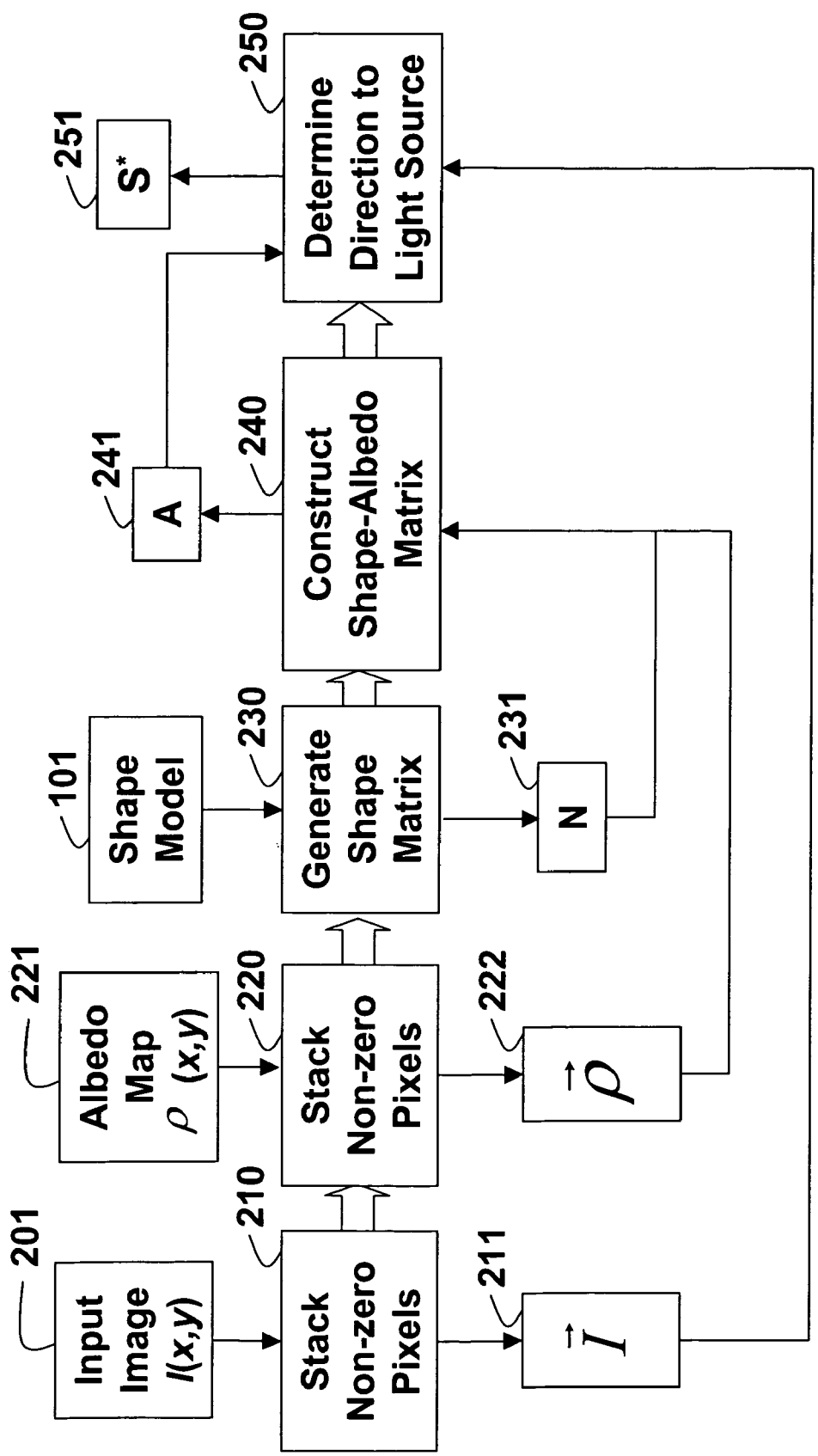
FIG. 2 is a flow diagram of a method for determining a direction of a principal light source in an image according to the invention.

As shown in FIG. 2, let $I(x, y)$ be the intensity at a pixel $(x, y)$ in an input image 201 corresponding to a point on a surface of a convex object, e.g., a face or the equivalent 3D shape model 101 with the Lambertian surface reflectance 102. The point is illuminated by a mixture of ambient light and a single principal light source 103 at infinity in a direction $s \in \mathbb{R}^3$, with intensity $|s|$.

I designate a unit surface normal $n=s/|s|$ as a direction from the point to the principal light source, i.e., pointing out. This direction, e.g., in azimuth/elevation angles, is my main estimand of interest. The magnitude of the light source is of little consequence for our method because the magnitude can be absorbed by the imaging system parameters that model gain and exposure.

Let $\rho(x, y)$ be the albedo 221 of the skin surface, which is either known or is otherwise estimated. Albedo is the fraction of incident light that is reflected by the surface, and for faces, albedo represents diffuse skin texture. Therefore albedo-map and texture-map are synonymous.

Let $n(x, y)$ 231 be the unit surface normal of the point on the facial surface that projects onto the pixel $I(x, y)$ in the image, under orthography.

Under the Lambertian model with a constant BRDF, a monochrome intensity of the pixel is given by $$I(x,y)=\alpha\{\rho(x,y)[\max(n(x,y)^T s, 0)+c]\}+\beta, \quad (1)$$

where $\alpha$ and $\beta$ represent intrinsic camera system parameters, i.e., lens aperture and gain. In my analysis, the parameters $\alpha$ and $\beta$ are essentially nuisance parameters, which only effect the dynamic range or (gain) and offset (exposure bias) of pixel intensity but not the lighting direction. Therefore, I can set $(\alpha, \beta)$ to their default values of $(1, 0)$ with proper normalization. The parameter $c$ represents a relative intensity of the ambient illumination, as described below, and can be set to zero, if necessary. The term $\max(n(x, y)^T s$ sets negative values of the Lambertian cosine factor to zero for surface points that are in a shadow.

For simplicity, I assume that only the single principal light source 103 is responsible for the majority of the observed directional lighting in the image, i.e., diffuse attenuation and/or shadowing. Any other ambient light sources present in the scene, e.g., diffuse or directional, are non-dominant. Hence, the overall contribution of the other ambient light sources is represented by a global ambient component with relative intensity $c$ in Equation (1).

Nearly all 2D view-based face identification systems are adversely affected by directional lighting, but to a much lesser extent by subtle ambient lighting effects, see Phillips et al. above. Therefore, in most cases, the direction to the principal lighting source is more important than any other lighting phenomena, especially when the other light sources are non-dominant.

Therefore, the invention reverses the effect of the principal illumination. This improves the performance of identifying objects that are illuminated arbitrarily.

The direction 251 to the principal lighting source is estimated by a least-squares formulation with simplifying assumptions based on the illumination model 102 as expressed by Equation (1). More important, I solve this problem efficiently in a closed form with elementary matrix operations and dot-products.

Estimating Light Source Direction

Specifically, as shown in FIG. 2, I construct 210 a column intensity vector $\vec{I}$ 211 of pixel intensities by 'stacking' all the non-zero values an input image $I(x, y)$ 201. If I assume that the object is lit only by the principal light source 103, i.e., there is no ambient light, then zero-intensity pixels are most likely in a shadow. Therefore, these pixels cannot indicate the direction to the principal light source, unless ray-casting is used locate the light source. In practical applications, there always is some amount of ambient light. Therefore, I can use a predetermined non-zero threshold or a predetermined mask for selecting pixels to stack in the intensity vector $\vec{I}$.

Similarly, I construct 220 an albedo vector $\vec{\rho}$ 222 to be the corresponding vectorized albedo map or diffuse texture 221.

I generate 230 a 3-column shape matrix $N$ 231 by row-wise stacking of the corresponding surface normals of the shape model 101. Then, I construct 240 a shape-albedo matrix $A \in \mathbb{R}^{P \times 3}$, where each row $\alpha$ in the matrix $A$ 241 is a product of the albedo and the unit surface normal in the corresponding rows of the albedo vector $\vec{\rho}$ 222 and the shape matrix $N$ 231. This corresponds to the element-wise Hadamard matrix product operator $\circ$:

$$A = (\vec{\rho} 1_{1 \times 3}) \circ N.$$

To determine 250 the unknown direction s*251 to the principal light source, I use a matrix equation for least-squares minimization of an approximation error in Equation (1) in the vectorized form $$\arg\min_{s} \|\vec{I} - \alpha c \vec{\rho} - As\|, \quad (2)$$

which yields the solution $$s^* = (A^T A)^{-1} A^T (\vec{I} - \alpha c \vec{\rho} - As), \quad (3)$$

where $^T$ denotes the transpose operator.

Note that I am only interested in the estimated unit light source vector s*/|s*| for its direction and not the magnitude. The magnitude depends on specific camera gain and exposure. This estimation problem is 'well-behaved' because it is heavily over-constrained. That is, the number of non-zero elements in $\vec{I}$ 'observations' is on the order of $O(10^3)$ as compared to the three unknowns in s*. In fact, because I only use the direction to the principle light source, there are only two angular estimands: azimuth and elevation. The estimate of the principal lighting direction is therefore quite stable with respect to noise and small variations in the input $\vec{I}$.

Note that the albedo-shape matrix A 241 comes from the generic shape model 101 and albedo 221. Hence, the shape-albedo matrix A 241 represents the entire class of objects, e.g., all frontal faces.

Assuming that the model 101 is adequately representative, there is no need to measure the exact shape or even exact albedo of an individual as long as all shapes and albedos are roughly equal to a first order as far as lighting direction is concerned.

Furthermore, the pseudo-inverse $(A^T A)^{-1}$ in Equation (3) is directly proportional to the error covariance of the least-squares estimate s* under Gaussian noise.

If I define a matrix $P = A(A^T A)^{-1}$, of dimensions p×3, then I see that the only on-line computation in Equation (3) is the projection of the intensity vector $\vec{I}$ 211 on the three columns of the matrix P, which are linearly independent. In fact, the three columns are basic functions for the illumination subspace of my generic face model.

Moreover, I can always find an equivalent orthogonal basis for this subspace using a QR-factorization: P=QR, where the unitary matrix Q has three orthonormal columns spanning the same subspace as the matrix P. The 3×3 upper triangular matrix R defines the quality of the estimates because $R^{-1}$ is a Cholesky factor, i.e., a matrix square root, of the error covariance. The QR-factorization aids the interpretation and analysis of the estimation in terms of pixels and bases because the input image is directly projected onto the orthonormal basis Q to estimate the direction 251 to the principal light source 103. The QR decomposition also saves computation in larger problems.

Because the matrices P and Q are independent of the input data, the matrices can be predetermined and stored for later use. Also, the computational cost of using Equation (3) minimal. The computation requires only three image-sized dot-products. The subsequent relighting, described below, only requires a single dot-product. Therefore, the lighting normalization according to the invention is practical for real-time implementation.

Face Relighting

Figure 3:
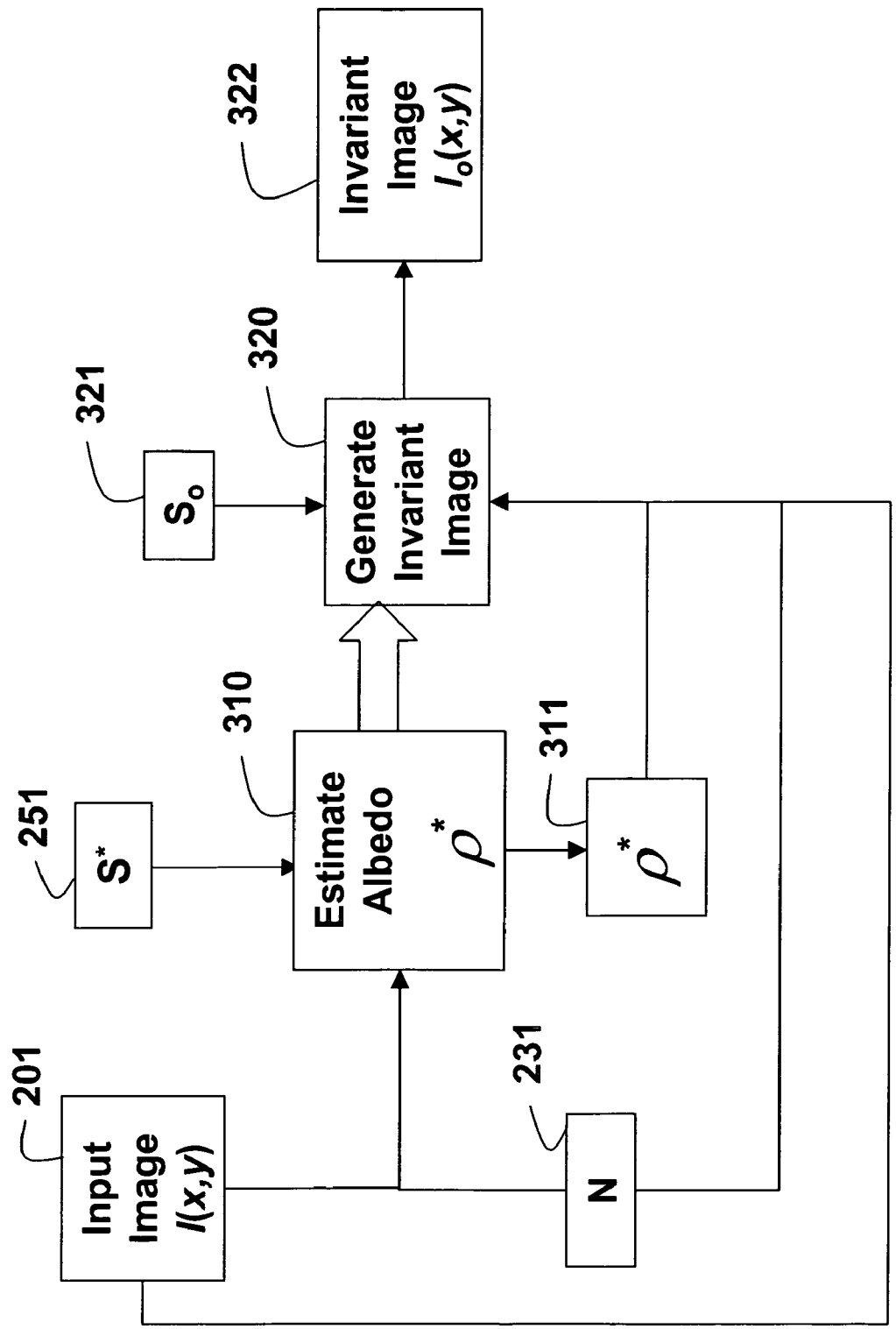
FIG. 3 is a flow diagram for photometrically normalizing images of an objects according to the invention.

As shown in FIG. 3, given the estimate s*251 of the directional lighting in the input image 201, I can approximately 'undo' the lighting" by estimating 310 the albedo 311 or diffuse skin texture of the face, and then relight 320 this specific albedo, combined with the generic shape model 101, under any desired illumination, e.g., frontal or pure diffuse.

Whereas both generic shape and albedo were used in the inverse problem of estimating the directional lighting, only the generic shape 101 is needed in the forward problem of relighting the input image 201, as the input image 201 itself provides the albedo information. The basic assumption here is that all objects have almost the same 3D geometry as defined by the generic shape model 101.

I find that moderate violations of this basic assumption are not critical because what is actually relighted to generate an illumination invariant template image is the texture as seen in the input image 201. This texture carries most of the information for 2D object identification. In fact, it is not possible to drastically alter the albedo of the input image by using a slightly different 3D face shape. Therefore, for faces, despite small variations in geometry for different individuals, an individual's identity is substantially preserved, as long as the face texture is retained.

Referring back to Equation (1), after I have a lighting estimate s*251 and my 'plug-in' shape, i.e., surface normals n 231 of the generic face model 101, I can solve directly for albedo using $$\rho^* = \frac{I - \beta}{\alpha(n^T s^* + c)}, \quad (4)$$

where for clarity the spatial indices (x, y) are not expressed for all 2D-arrays (I, ρ, n). Here, it is assumed that the intensities are non-zero, and that $n^T s^*$ is greater than zero. Notice that the estimated albedo ρ*311 at a point (x, y) depends only on the corresponding pixel intensity I(x, y) of the input image 201 and the surface normal n(x, y) 231. Thus, if a point on an object is in shadow, and there is no ambient illumination, then I is zero and $n^T s^*$ is negative. In this case, the corresponding albedo cannot be estimated with Equation (4), and a default average albedo is substituted in for the pixel corresponding to that point.

The estimated albedo 311 is then used to generate 320 our invariant (fixed-illumination) image $I_o$ 322

$$I_o = \alpha_o \{\rho^* [\max(n^T s_o, 0) + c_o]\} + \beta_o. \quad (5)$$

In equation (5) the variable $s_o$ 321 denotes the invariant direction to the desired source of principal illumination. The default direction is directly in front of the object and aligned with a horizontal axis through the object, i.e., on-axis frontal lighting, and $c_o$ is the ambient component of the output image 322. Similarly $\alpha_o$ and $\beta_o$ designate the format parameters of an output display device.

Ambient Illumination

It is also possible to model arbitrary ambient illumination as represented by the parameter c. By using a representative set of N training images, I can estimate numerically components of the ambient illumination using optimality criteria $$c^* = \arg\min_c \sum_{l=1}^{N} \left| \rho_i(c) - \frac{1}{N}\sum_{i=1}^{N} \rho_i(c) \right|^2, \quad (6)$$

where $\rho_i(c)$ denotes an albedo of the $i^{th}$ training image estimated with a relative ambient intensity c as defined in Equation (3).

EFFECT OF THE INVENTION

The invention provides a simple and practical method for estimating a direction to a principal light source in a photometrically uncalibrated input image of an object such as a face. The exact shape and albedo (surface texture) of the object is unknown, yet the generic shape and albedo of the object class is known. Furthermore, the method photometrically normalizes the input image for illumination-invariant template matching and object identification. The necessary computations require less than five dot-products for each pixel in the input image.

The method has better performance for datasets of realistic access-control imagery, which exhibits complex real-world illumination environments. The performance enhancement is directly due to a tighter clustering of an individual's images in image space, which will help sophisticated image matching and identification systems to achieve illumination invariance.

Results indicate that the estimation of lighting direction is relatively robust and the subsequent relighting normalization is feasible in real-time, with only a few simple dot product operations. The lighting normalization according to the invention is a viable and superior alternative to linear ramp and histogram equalization techniques of the prior art.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for determining a direction of a principal light source in an image, comprising:
   acquiring, with a camera, an input image I of an object illuminated by a principal light source from an unknown direction s, the input image including an array of pixels, and each pixel having an intensity I(x, y);
   constructing an intensity vector $\vec{I}$ from the intensities of the input image;
   defining an albedo map $\rho$ for the object;
   constructing an albedo vector $\vec{\rho}$ from the albedo map;
   generating a shape matrix N for the object;
   multiplying the albedo vector $\vec{\rho}$ by the shape matrix N to obtain a shape-albedo matrix A;
   determining an estimated direction s* to the principal light source from the intensity vector $\vec{I}$, the albedo vector $\vec{\rho}$ and the shape-albedo matrix A according to an optimization $$s^* = \arg\min_s \|\vec{I} - \vec{\rho} - As\|.$$

2. The method of claim 1, in which the optimization $$\arg\min_s \|\vec{I} - \vec{\rho} - As\|$$

has a solution $$s^* = (A^T A)^{-1} A^T (\vec{I} - \vec{\rho} - As),$$

where $^T$ is a transpose operator.

3. The method of claim 1, in which the object belongs to a class of objects represented by a generic shape model as represented by the shape matrix N.

4. The method of claim 1, in which the object is a face.

5. The method of claim 1, further comprising:
   illuminating the object by unknown ambient illumination.

6. The method of claim 1, further comprising:
   stacking non-zero intensities in the input image I to construct the intensity vector.

7. The method of claim 6, further comprising:
   selecting the non-zero intensities according to a predetermined threshold value.

8. The method of claim 6, further comprising:
   selecting the non-zero intensities according to a predetermined criteria.

9. The method of claim 6, further comprising:
   selecting the non-zero intensities according to a mask.

10. The method of claim 1, further comprising:
    constructing the albedo vector $\vec{\rho}$ from a corresponding vectorized albedo map.

11. The method of claim 1, further comprising:
    constructing the albedo vector $\vec{\rho}$ from a diffuse texture.

12. The method of claim 3, further comprising:
    generating the shape matrix by stacking surface normals of the generic shape model.

13. The method of claim 1, in which the multiplying corresponds to an element-wise Hadamard matrix product o:

$$A = (\vec{\rho} 1_{1 \times 3}) o N.$$

14. The method of claim 1, further comprising:
    estimating directly an unknown albedo from the input image using a formula $$\rho^* = \frac{I - \beta}{\alpha(n^T s^* + c)},$$

where $\alpha$ and $\beta$ jointly model an intensity gain and offset of the camera respectively, c is a relative ambient illumination component, n is a unit surface normal, and $^T$ is a transpose operator.

15. The method of claim 12, further comprising:
    assigning an average albedo to a particular pixel if the intensity of the particular pixel is zero.

16. The method of claim 1, further comprising:
    generating an illumination-invariant output image under desired illumination using a formula $$I_o = \alpha_o \{\rho^* [\max(n^T s_o, 0) + c_o]\} + \beta_o,$$

where $\alpha_o$ and $\beta_o$ are a gain and offset of an output display device, $c_o$ is an intensity of the desired ambient illumination lighting in the illumination-invariant output image, n is a surface normal, $s_o$ is a direction of the desired relative ambient lighting in the illumination-invariant output image, and $^T$ is a transpose operator.

17. The method of claim 5, further comprising:
acquiring a set of N training images of the object; and
estimating properties of the unknown ambient illumination using an optimality criteria $$c^* = \arg\min_s \sum_{l=1}^{N} \left| \rho_i(c) - \frac{1}{N} \sum_{i=1}^{N} \rho_i(c) \right|^2,$$

where c is an intensity of the unknown ambient illumination, and $\rho_i(c)$ denotes an albedo of the $i^{th}$ training image.

18. The method of claim 2, further comprising:
defining a matrix $P = A(A^T A)^{-1}$; and
applying a QR-factorization P=QR to estimate an equivalent orthogonal basis for the matrix P, where the unitary matrix Q has three orthonormal columns spanning a subspace as the matrix P, and the 3×3 upper triangular matrix R defines a quality of the estimate because $R^{-1}$ is a matrix square root of an error covariance.

* * * * *